United States Patent
Ho et al.

(10) Patent No.: US 9,127,825 B2
(45) Date of Patent: Sep. 8, 2015

(54) DAY/NIGHT SWITCHABLE LIGHT ADJUSTING DEVICE AND LIGHT ADJUSTING METHOD THEREOF

(71) Applicant: GCSOL Tech Co., Ltd., Taichung County (TW)

(72) Inventors: Fang-Chuan Ho, Hsinchu (TW); Jui-Fen Pai, Nantou County (TW)

(73) Assignee: GCSOL Tech Co., Ltd., Taichung (TW)

( * ) Notice: Subject to any disclaimer, the term of this patent is extended or adjusted under 35 U.S.C. 154(b) by 7 days.

(21) Appl. No.: 14/064,218

(22) Filed: Oct. 28, 2013

(65) Prior Publication Data

US 2015/0055335 A1    Feb. 26, 2015

(30) Foreign Application Priority Data

Aug. 23, 2013   (TW) .............................. 102130295 A (51) Int. Cl.
*F21V 7/00* (2006.01)
*H05B 33/08* (2006.01)
*F21Y 101/02* (2006.01)
*F21Y 105/00* (2006.01)
*F21Y 113/00* (2006.01)

(52) U.S. Cl.
CPC *F21V 7/00* (2013.01); *H05B 33/08* (2013.01); *F21Y 2101/02* (2013.01); *F21Y 2105/008* (2013.01); *F21Y 2113/005* (2013.01)

(58) Field of Classification Search
CPC ..................................... F21V 9/02; F21V 7/00
USPC .................... 362/231, 230, 237, 241, 293
See application file for complete search history.

(56) References Cited

U.S. PATENT DOCUMENTS

| | | | | |
|---|---|---|---|---|
| 4,074,124 A * | 2/1978 | Maute et al. | ............. | 362/217.02 |
| 4,091,441 A * | 5/1978 | Ott | ................................ | 362/1 |
| 5,343,121 A * | 8/1994 | Terman et al. | ................ | 315/158 |
| 5,589,741 A * | 12/1996 | Terman et al. | ................ | 315/360 |
| 6,776,496 B2 | 8/2004 | Cok | | |
| 7,438,719 B2 * | 10/2008 | Chung et al. | .................... | 607/88 |
| 8,350,490 B2 * | 1/2013 | Browne et al. | ................ | 315/291 |
| 2010/0188836 A1 * | 7/2010 | Wu et al. | ......................... | 362/84 |
| 2010/0287830 A1 * | 11/2010 | Chen et al. | ............... | 47/58.1 LS |
| 2012/0104277 A1 | 5/2012 | Morren | | |
| 2013/0021793 A1 * | 1/2013 | Zimmerman et al. | ........ | 362/231 |
| 2013/0077345 A1 | 3/2013 | Sato et al. | | |

* cited by examiner

Primary Examiner — Jong-Suk (James) Lee
Assistant Examiner — Christopher E Dunay
(74) Attorney, Agent, or Firm — CKC & Partners Co., Ltd.

(57) ABSTRACT

A day/night switchable light adjusting device and light adjusting method thereof are provided. The day/night switchable light adjusting device is composed of a plurality of panels; each panel includes a reflecting surface and at least one lighting unit. Each lighting unit can emit various wavelength region lights, and the various wavelength lights are mixed on a light collecting component. A control unit is provided for adjusting the various wavelength region lights corresponding to day/night variation. A light intensity of a cyan region light or a blue region light is reduced for preventing an over-inhibition on a quantity of Melatonin.

14 Claims, 10 Drawing Sheets

DAY/NIGHT SWITCHABLE LIGHT ADJUSTING DEVICE AND LIGHT ADJUSTING METHOD THEREOF

RELATED APPLICATIONS

The application claims priority to Taiwan Application Serial Number 102130295, filed on Aug. 23, 2013, which is herein incorporated by reference.

BACKGROUND

1. Technical Field

The present disclosure relates to a light adjusting device and light adjusting method thereof, especially relates to a day/night switchable light adjusting device and light adjusting method thereof.

2. Description of Related Art

Melatonin is a kind of Hormone that exists in a human body. In the human body, Melatonin is produced by a pineal. Melatonin has great influence on a sleep/awake mode, a day/night adjusting mode or a season adjusting mode of a human. High quantity of Melatonin increases drowsiness, and low quantity of Melatonin influences excitation factor of a people.

The quantity of Melatonin is influenced by various factors. In a physiological cycle, the quantity of Melatonin is different in a day time and a night time. In a day time, the quantity of Melatonin is low. On the contrary, in a night time, the quantity of Melatonin is increased rapidly. Another factor that influences the quantity of Melatonin is related with a wavelength region and intensity of a light. It is known that a cyan region light (550 nm~540 nm) and a blue region light (480 nm~500 nm) will decrease the quantity of Melatonin.

However, in a daily life, a lighting device usually utilizes a white light source, which contains various wavelength regions, such as the cyan region light or the blue region light as described above. Therefore, the quantity of Melatonin will be decreased by the white light source. In some situations, reduction of the quantity of Melatonin has bad influence. For example, some night workers should keep awake in the night time. Thus a day/night switchable lighting device is necessary.

SUMMARY

According to one aspect of the present disclosure, a day/night switchable light adjusting device is provided. The day/night switchable light adjusting device includes a first panel, a second panel, a light collecting component, and a control unit. The first panel includes at least one first lighting unit and a first reflecting surface; the first lighting unit emits a first wavelength light. One side of the second panel is connected with one side of the first panel and an angle and at least one opening are formed between the first panel and the second panel; the second panel includes at least one second lighting unit and a second reflecting surface, each second lighting unit includes two sub lighting units, the two sub lighting units emit a first sub wavelength light and a second sub wavelength light respectively, and the first sub wavelength light and the second sub wavelength light are mixed for forming a second wavelength light. The light collecting component is disposed on the opening. The control unit is electrically connected to the first lighting unit and the second lighting unit. The control unit adjusts the first wavelength light and the second wavelength light with a day/night variation respectively. Wherein the first reflecting surface and the second reflecting surface reflect the first wavelength light and/or the second wavelength light, and the first wavelength light, a reflected light of the first wavelength light, the second wavelength light, and a reflected light of the second wavelength light are mixed on the light collecting component.

According to another aspect of the present disclosure, a light adjusting method applied to the day/night switchable light adjusting device is provided. The light adjusting method includes: at least on reflecting component is provided to be connected with one side of the first panel and one side of the second panel; different colors are selected of the first wavelength light and the second wavelength light, wherein the second wavelength light are formed form mixing of the first sub wavelength light and the second sub wavelength light, and one of the first wavelength light, the first sub wavelength light and the second sub wavelength light is a blue region light or a cyan region light; the light intensity of the blue region light or the cyan region light is adjusted with a day/night variation, and the light intensity of the blue region light or the cyan region light is decreased from a day time to a night time; the first wavelength light and the second wavelength light are reflected by the reflecting component, the first reflecting surface and the second reflecting surface; and the first wavelength light, the second wavelength light, a reflected light of the first wavelength light and a reflected light of the second wavelength light on the light collecting component.

According to still another aspect of the present disclosure, a day/night switchable light adjusting device is provided. The day/night switchable light adjusting device includes a first panel, a second panel, a third panel, a light collecting component and a control unit. The first panel includes at least one first lighting unit and a first reflecting surface, the first lighting unit emits a first wavelength light. The second panel includes at least one second lighting unit and a second reflecting surface, the second lighting unit emits a second wavelength light, wherein one side of the second panel is connected with one side of the first panel, and an angle is formed between the first panel and the second panel. The third panel includes at least one third lighting unit and a third reflecting surface, the third lighting unit emits a third wavelength light, wherein one side of the third panel is connected with another side of the second panel, another angle is formed between the second panel and the third panel, the first panel, the second panel and the third panel are inter-connected, and an opening is formed. The light collecting component is disposed on the opening. The control unit is electrically connected with the first lighting unit, the second lighting unit and the third lighting unit, the control unit adjusts the first wavelength light, the second wavelength light and the third wavelength light respectively with a day/night variation. Wherein the first reflecting surface, the second reflecting surface and the third reflecting surface reflect the first wavelength light, the second wavelength light and/or the third wavelength light, and the first wavelength light, a reflected light of the first wavelength light, the second wavelength light, a reflected light of the second wavelength light, the third wavelength light and a reflected light of the third wavelength light are mixed on the light collecting component.

According to another aspect of the present disclosure, a light adjusting method applied to the day/night switchable light adjusting device is provided. The light adjusting method includes: at least one reflecting component is provided to be connected with one side of the first panel, one side of the second panel and one side of the third panel; different colors of the first wavelength light, the second wavelength light and the third wavelength light are selected, wherein one of the first wavelength light, the second wavelength light and the third wavelength light is a blue region light or a cyan region light; the light intensity of the blue region light or the cyan region light is adjusted with a day/night variation, and the light intensity of the blue region light or the cyan region light is decreased from a day time to a night time; the first wavelength light, the second wavelength light and the third wavelength light are reflected by the reflecting component, the first reflecting surface, the second reflecting surface and the third reflecting surface; and the first wavelength light, the second wavelength light, the third wavelength light, a reflected light of the first wavelength light, a reflected light of the second wavelength light and a reflected light of the third wavelength light are mixed on the light collecting component.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
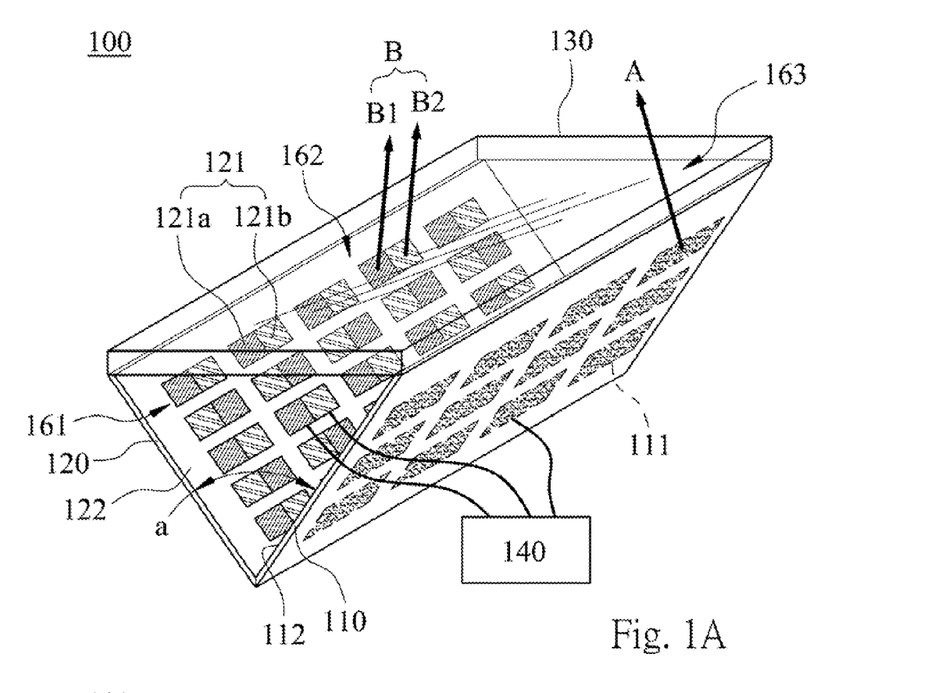
FIG. 1A is a structure diaphragm showing a day/night switchable light adjusting device according to one embodiment of the present disclosure.

FIG. 1A is a structure diaphragm showing a day/night switchable light adjusting device 100 according to one embodiment of the present disclosure. The day/night switchable light adjusting device 100 includes a first panel 110, a second panel 120, a light collecting component 130 and a control unit 140. The first panel 110 includes at least one first lighting unit 111 and a first reflecting surface 112. The second panel 120 includes at least one second lighting unit 121 and a second reflecting surface 122. The second lighting unit 121 is composed of a sub lighting unit 121a and a sub lighting unit 121b. The first lighting unit 111 emits a first wavelength light A, and the second lighting unit 111 emits a second wavelength light B. The second wavelength light B is a mixture of a sub wavelength light B1 emitted from the sub lighting unit 121a and a sub wavelength light B2 emitted from the sub lighting unit 121b.

The first lighting unit 111 and the second lighting unit 121 are disposed on the first reflecting surface 112 and the second reflecting surface 122. The reflecting surface 112 and the second reflecting surface 122 are opposed to each other. Each of the first lighting unit 111 and the second lighting unit 121 can be an inorganic light emitting diode panel or an organic light emitting diode panel respectively. When an organic light emitting diode panel is used, a uniform planar light, high lighting efficiency and low heat radiation can be obtained.

One side of the first panel 110 is connected with one side of the second panel 120, and an angle a and openings 161, 162 and 163 are formed. The angle a is smaller than 180 degrees, thus the first reflecting surface 112 and the second reflecting surface 122 are opposed to each other.

The light collecting component 130 is disposed on one of the openings 161, 162 and 163 for collecting and mixing light. Preferably, the light collecting component 130 is disposed on the opening 162, and a positive light of the first lighting unit 111 and a positive light of the second lighting unit 121 are emitted toward the light collecting component 130.

The control unit 140 is electrically connected to the first lighting unit 111 and the second lighting unit 121 for adjusting the first lighting unit 111 and the second lighting unit 121 respectively. In detail, the control unit 140 can adjust the light intensity of the first lighting unit 111 and the second lighting unit 121 with a day/night variation.

Figure 1B:
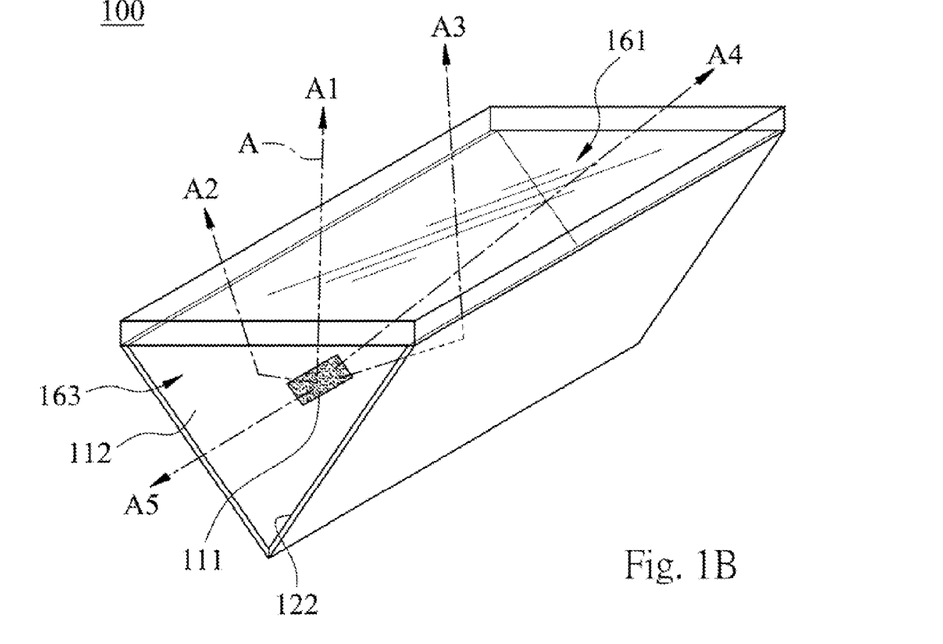
FIG. 1B shows an optical path of a first wavelength light of a first lighting unit in FIG. 1A.

FIG. 1B shows an optical path of the first wavelength light A of the first lighting unit 111 in FIG. 1A. The optical path of the first lighting unit 111, the sub lighting unit 121a and the sub lighting unit 121b are similar; in FIG. 1B, the optical path of the first wavelength light A of the first lighting unit 111 is taken for example.

The first wavelength light A emitted from the first lighting unit 111 has five optical paths, A1, A2, A3, A4 and A5. The optical path A1 is directly emitted to the light collecting component 130. The optical path A2 is a reflected light of the first wavelength light A by the first reflecting surface 112 and is reflected to the light collecting component 130. The optical path A3 is a reflected light of the first wavelength light A by the second reflecting surface 122 and is reflected to the light collecting component 130. The optical path A4 is emitted to the opening 161. The optical path A5 is emitted to the opening 163. The optical paths A1, A2 and A3 are mixed on the light collecting component 130 and emitted through the light collecting component 130. The optical paths of the first wavelength light A can be collected to the light collecting component 130 by multiple reflections. For example, the optical path A2 can be reflected by the first reflecting surface 112, and then emitted toward the light collecting component 130, or, the optical A2 can be reflected by the first reflecting surface 112, then reflected by the second reflecting surface 122, and then emitted toward the light collecting component 130.

Figure 2A:
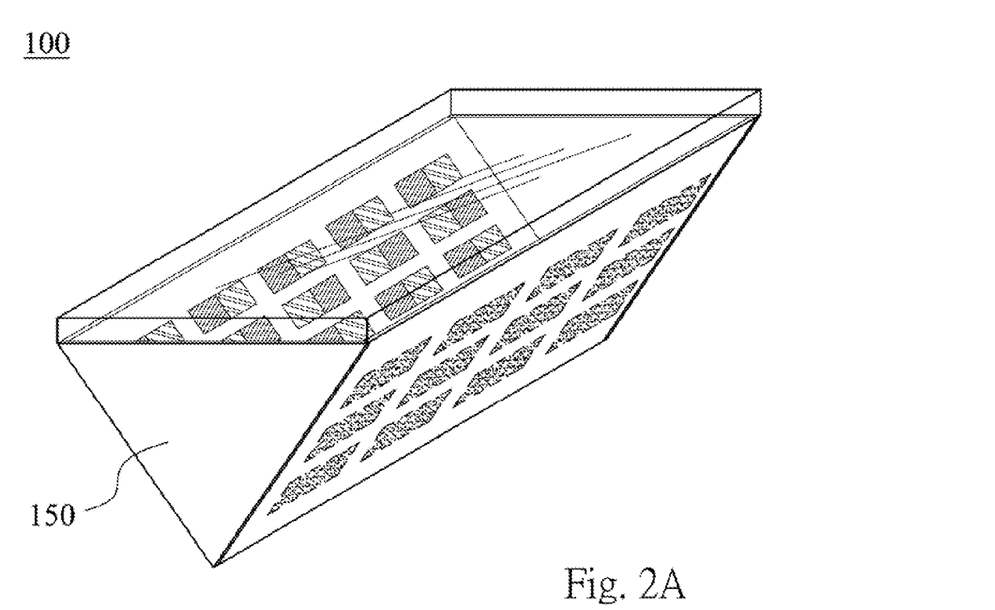
FIG. 2A is a structure diaphragm showing a day/night switchable light adjusting device according to another embodiment of FIG. 1A.
Figure 2B:
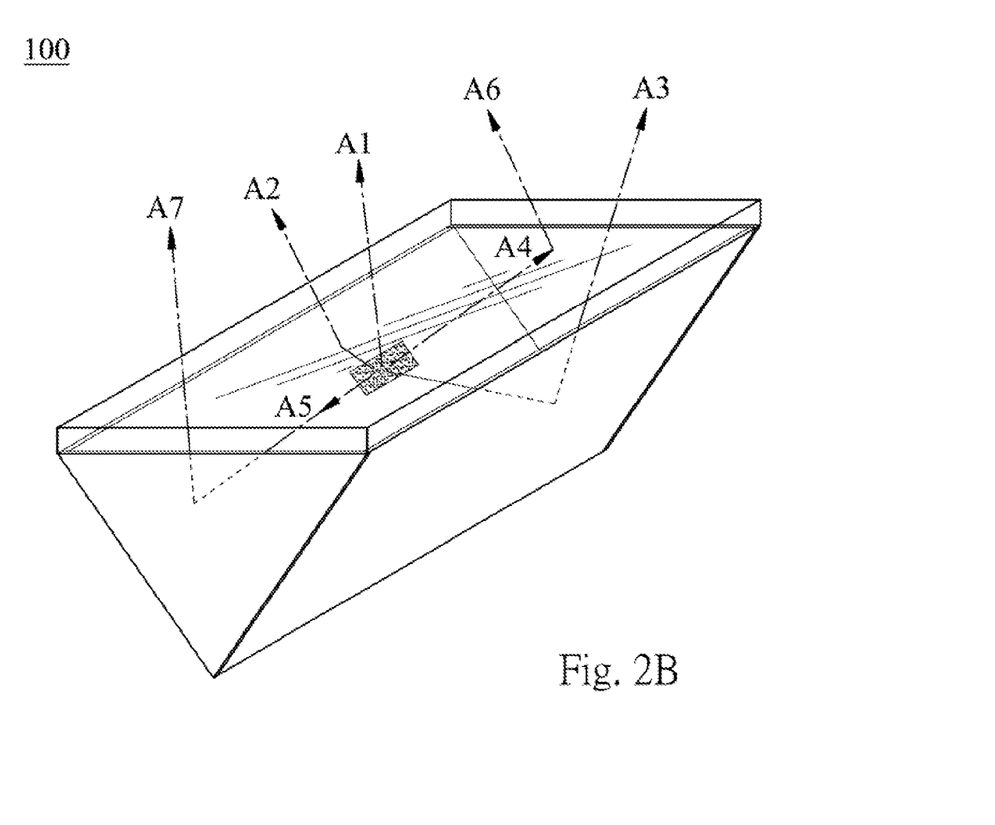
FIG. 2B shows an optical path of a first wavelength light of a first lighting unit in FIG. 2A.

FIG. 2A is a structure diaphragm showing a day/night switchable light adjusting device 100 according to another embodiment of FIG. 1A; and FIG. 2B shows an optical path of a first wavelength light A of the first lighting unit 111 in FIG. 2A. In FIG. 2A, two reflecting components 150 are added to the two side of the day/night switchable light adjusting device 100. The two reflecting components 150 are connected with one side of the first panel 110 and one side of the second panel 120. The two reflecting components 150 reflect the optical path A4 and the optical path A5. In FIG. 2B, the optical path A6 and the optical path A7 are the reflected light of the optical path A4 and the optical path A5 respectively. The first wavelength light A and the second wavelength light B can be multiply reflected by the first reflecting surface 112, the second reflecting surface 122 and the reflecting components 150, and finally be collected and mixed on the light collecting component 130. Therefore, multiply reflected first wavelength light A and second wavelength light B can produce a high accurate light adjusting effect.

Figure 3A:
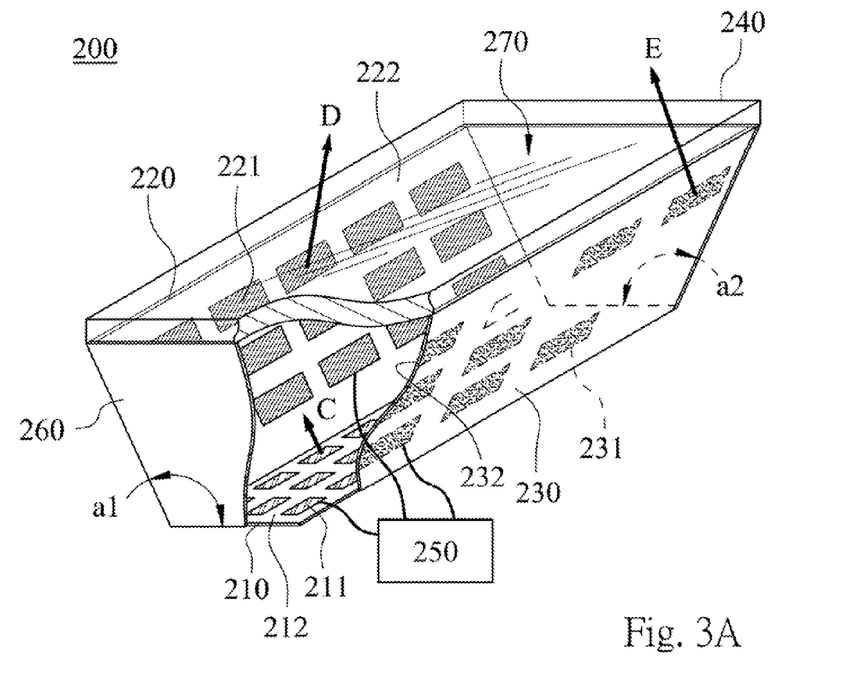
FIG. 3A is a structure diaphragm showing a day/night switchable light adjusting device according to another embodiment of the present disclosure.

FIG. 3A is a structure diaphragm showing a day/night switchable light adjusting device 200 according to another embodiment of the present disclosure. The day/night switchable light adjusting device 200 includes a first panel 210, a second panel 220, a third panel 230, a light collecting component 240, a control unit 250 and two reflecting components 260. The first panel 210 includes at least one first lighting unit 211 and a reflecting surface 212. The second panel 220 includes at least one second lighting unit 221 and a second reflecting surface 222. The third panel 230 includes at least one third lighting unit 231 and a third reflecting surface 232.

The first lighting unit 211, the second lighting unit 221 and the third lighting unit 231 are disposed on the first reflecting surface 212, the second reflecting surface 222 and the third reflecting surface 232 respectively. The first reflecting surface 212, the second reflecting surface 222 and the third reflecting surface 232 are opposed to each other. The first lighting unit 211 emits a first wavelength light C, the second lighting unit 221 emits a second wavelength light D, and the third lighting unit 231 emits a third wavelength light E. Each of the first lighting unit 211, the second lighting unit 221 and the third lighting unit 231 can be an inorganic light emitting diode panel or an organic light emitting diode panel respectively. When an organic light emitting diode panel is used, a uniform planar light, high lighting efficiency and low heat radiation can be obtained.

One side of the first panel 210 is connected with one side of the second panel 220, and an angle a1 is formed; another side of the first panel 10 is connected with one side of the third panel 230, and an angle a2 is formed. An opening 270 is formed between the first panel 210, the second panel 220 and the third panel 230. The angles a1 and a2 are smaller than 180 degrees respectively, thus the first reflecting surface 212, the second reflecting 222 and the third reflecting surface 232 are opposed to each other.

The two reflecting components 260 are connected with one side of the first panel 210, one side of the second panel 220 and one side of the third panel 230.

The light collecting component 240 is disposed on the opening 270.

The control unit 250 is electrically connected to the first lighting unit 211, the second lighting unit 221 and the third lighting unit 231 for adjusting the first lighting unit 211, the second lighting unit 221 and the third lighting unit 231 respectively. In detail, the control unit 250 can adjust the light intensity of the first lighting unit 211, the second lighting unit 221 and the third lighting unit 231 with a day/night variation.

Figure 3B:
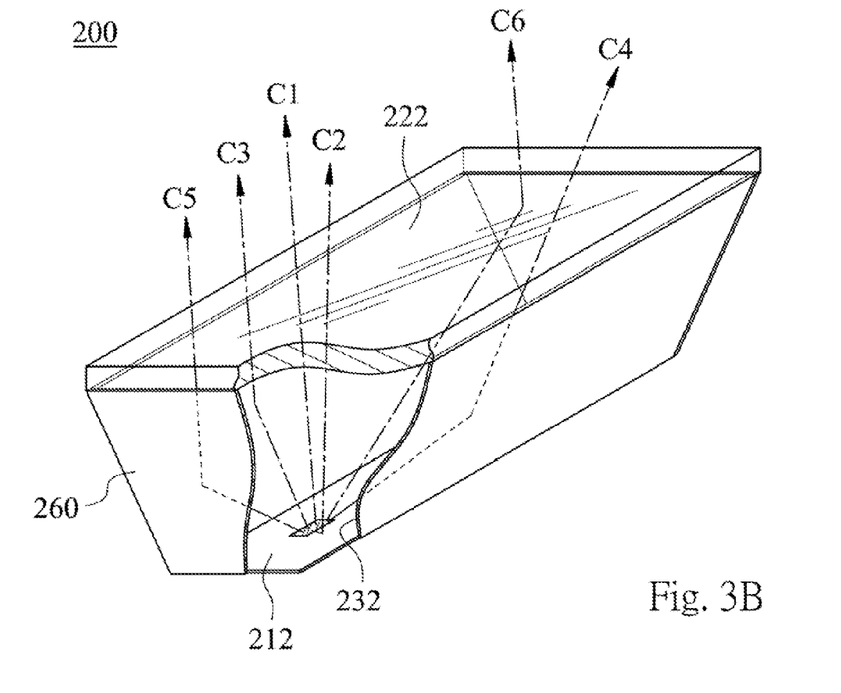
FIG. 3B shows an optical path of a fists wavelength light of a first lighting unit in FIG. 3A.

FIG. 3B shows an optical path of the fists wavelength light C of the first lighting unit 211 in FIG. 3A. The optical path of the first lighting unit 211, the second lighting unit 221 and the third lighting unit 231 are similar; in FIG. 3B, the optical path of the first wavelength light C of the first lighting unit 211 is taken for example.

The first wavelength light C emitted from the first lighting unit 211 has six optical paths, C1, C2, C3, C4, C5 and C6. The optical path C1 is directly emitted to the light collecting component 240. The optical path C2 is a reflected light of the first wavelength light C by the first reflecting surface 212 and is reflected to the light collecting component 240. The optical path C3 is a reflected light of the first wavelength light C by the second reflecting surface 222 and is reflected to the light collecting component 240. The optical path C4 is a reflected light of the first wavelength light C by the third reflecting surface 232 and is reflected to the light collecting component 240. The optical path C5 and C6 are two lights emitted to different two sides, and are reflected by the reflecting components 260. The optical path C1 to C6 are mixed on the light collecting component 240 and emitted through the light collecting component 240. The optical path of the first wavelength light C can be collected to the light collecting component 240 by multiple reflections. For example, the optical path C2 can be reflected by the first reflecting surface 212, and then emitted toward the light collecting component 240, or, the optical C2 can be reflected by the first reflecting surface 212, then reflected by the second reflecting surface 222, the third reflecting surface 232, and the reflecting component 260, and then emitted toward the light collecting component 240. Similarly, the second wavelength light D and the third wavelength light E can be multiply reflected by the first reflecting surface 212, the second reflecting surface 222, the third reflecting surface 232 and the reflecting component 260, and collected and mixed on the light collecting component 240 for obtaining a complicated and high accurate light adjusting effect.

Figure 4:
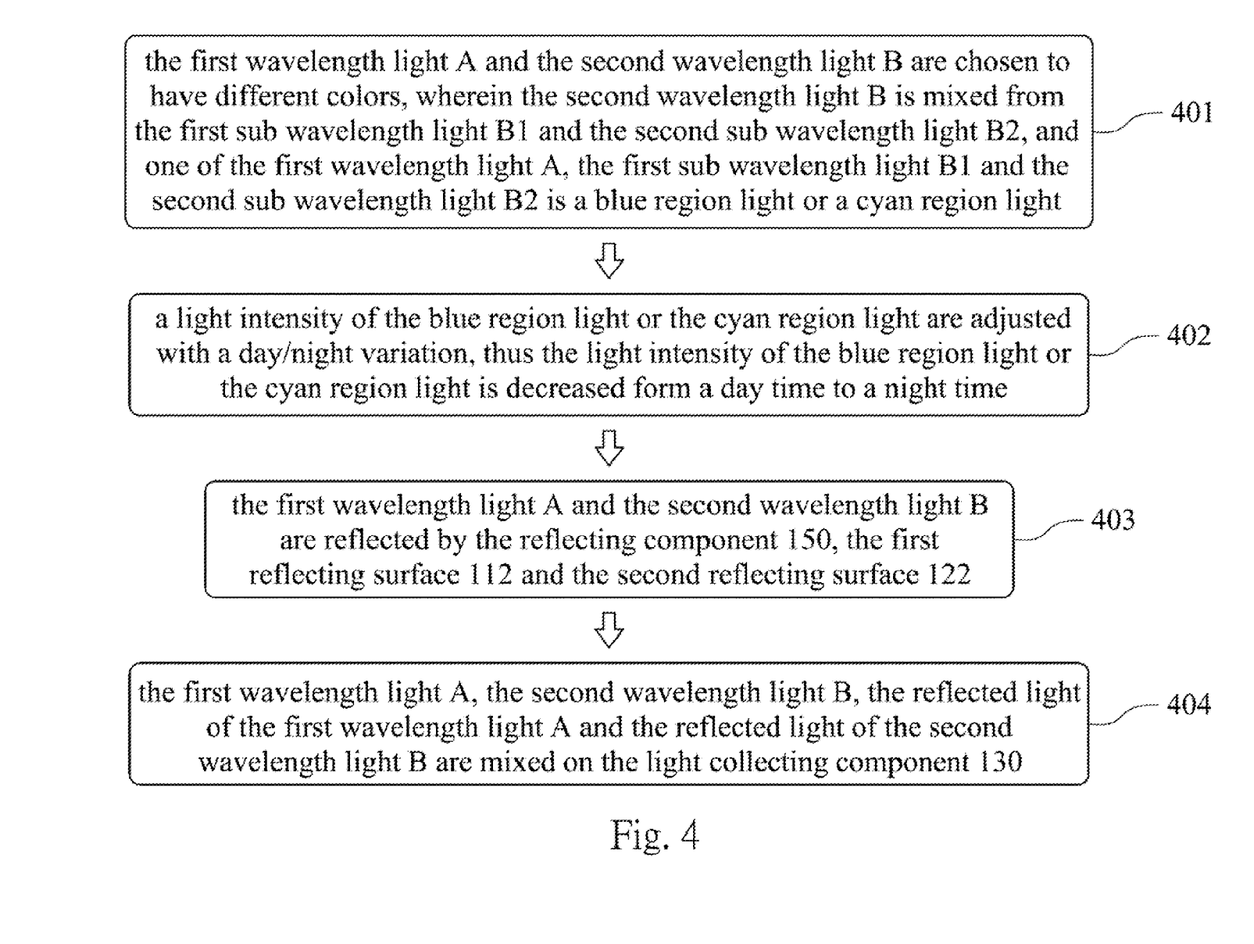
FIG. 4 is a flow chart showing a light adjusting method according to the day/night switchable light adjusting device in FIG. 2A.

FIG. 4 is a flow chart showing a light adjusting method according to the day/night switchable light adjusting device 100 in FIG. 2A. The light adjusting method includes: Step 401, the first wavelength light A and the second wavelength light B are chosen to have different colors, wherein the second wavelength light B is mixed from the first sub wavelength light B1 and the second sub wavelength light B2, and one of the first wavelength light A, the first sub wavelength light B1 and the second sub wavelength light B2 is a blue region light or a cyan region light; Step 402, a light intensity of the blue region light or the cyan region light is adjusted with a day/night variation, thus the light intensity of the blue region light or the cyan region light is decreased form a day time to a night time; Step 403, the first wavelength light A and the second wavelength light B are reflected by the reflecting component 150, the first reflecting surface 112 and the second reflecting surface 122; Step 404, the first wavelength light A, the second wavelength light B, the reflected light of the first wavelength light A and the reflected light of the second wavelength light B are mixed on the light collecting component 130.

In step 401, the first wavelength light A and the second wavelength light B are mixed for forming a white light.

The step 402 are based on the quantity of Melatonin is decreased from a day time to a night time. It is know that the blue region light or the cyan region light will decrease the quantity of Melatonin rapidly, and has a great influence on the physiological cycle of a human body. Therefore, in the aforementioned light adjusting method, the control unit 104 adjusts the light intensity of the first wavelength light A emitted from the first lighting unit 111 and the second wavelength light B emitted from the second lighting unit 121 respectively. Owing to one of the first wavelength light A and the second wavelength light B includes a blue region light or a cyan region light, the light intensity of the blue region light or the cyan region light can be decreased for reducing a inhibition on the quantity of Melatonin.

Figure 5:
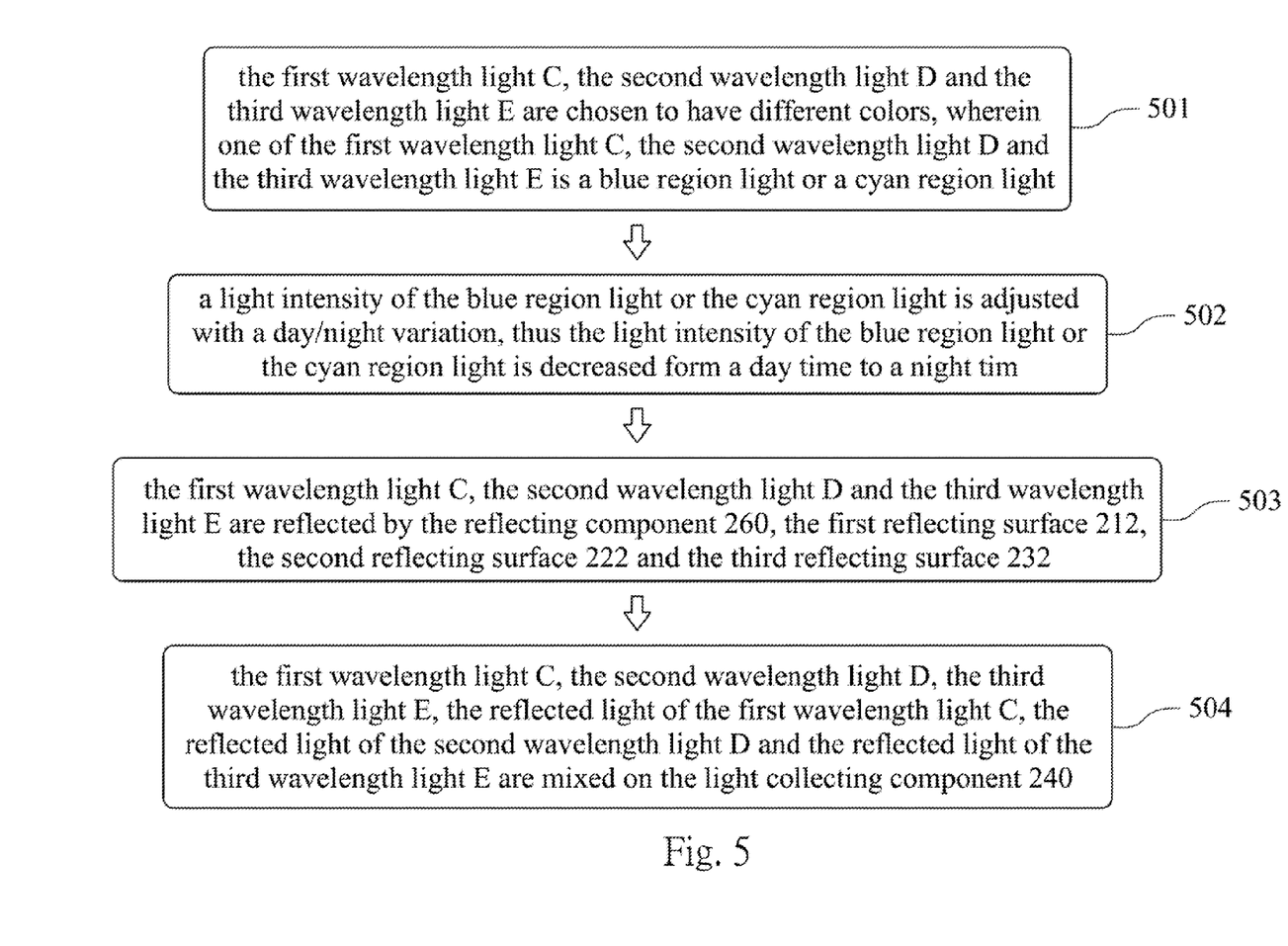
FIG. 5 is a flow chart showing a light adjusting method according to the day/night switchable light adjusting device in FIG. 3A.

FIG. 5 is a flow chart showing a light adjusting method according to the day/night switchable light adjusting device 200 in FIG. 3A. The light adjusting method includes: Step 501, the first wavelength light C, the second wavelength light D and the third wavelength light E are chosen to have different colors, wherein one of the first wavelength light C, the second wavelength light D and the third wavelength light E is a blue region light or a cyan region light; Step 502, a light intensity of the blue region light or the cyan region light is adjusted with a day/night variation, thus the light intensity of the blue region light or the cyan region light is decreased form a day time to a night time; Step 503, the first wavelength light C, the second wavelength light D and the third wavelength light E are reflected by the reflecting component 260, the first reflecting surface 212, the second reflecting surface 222 and the third reflecting surface 232; Step 504, the first wavelength light C, the second wavelength light D, the third wavelength light E, the reflected light of the first wavelength light C, the reflected light of the second wavelength light D and the reflected light of the third wavelength light E are mixed on the light collecting component 240.

In step 501, the first wavelength light C, the second wavelength light D and the third wavelength light E are mixed for forming a white light.

The step 502 is the same as step 402, is based on the quantity of Melatonin is decreased from a day time to a night time, and can be decreased by the blue region light or the cyan region light, thereby having a great influence on the physiological cycle of a human body. Therefore, in the aforementioned light adjusting method, the control unit 250 adjusts the light intensity of the first wavelength light C emitted from the first lighting unit 211, the second wavelength light D emitted from the second lighting unit 221, and the third wavelength light E emitted from the third lighting unit 231 respectively. Owing to one of the first wavelength light C, the second wavelength light D and the third wavelength light E includes a blue region light or a cyan region light, the light intensity of the blue region light or the cyan region light can be decreased for reducing an inhibition on the quantity of Melatonin.

Figure 6:
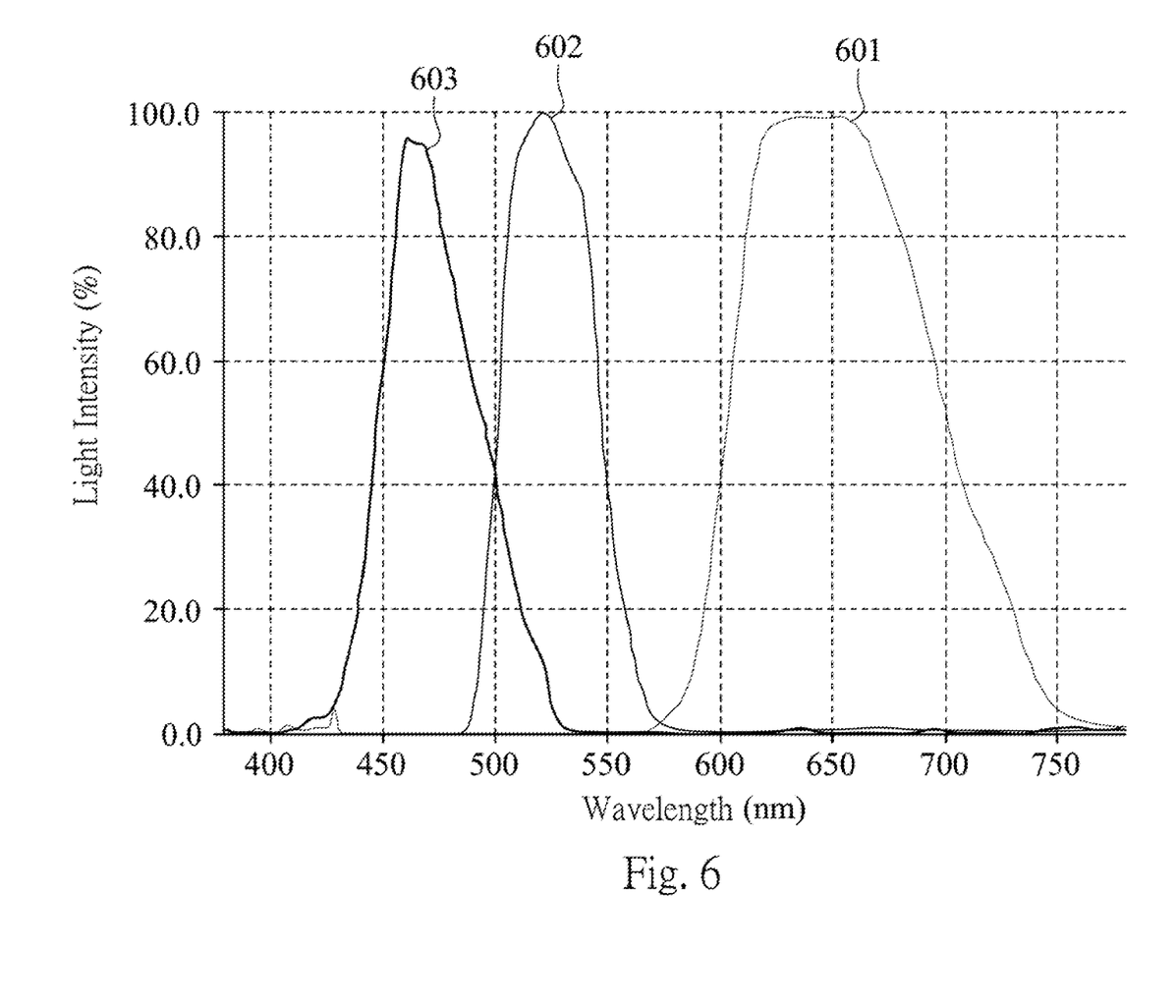
FIG. 6 shows a light intensity versus wavelength according to one embodiment of the light adjusting method in FIG. 4 or FIG. 5.

FIG. 6 shows a light intensity versus wavelength according to one embodiment of the light adjusting method in FIG. 4 or FIG. 5. Please also refer to FIG. 1A and FIG. 2A. For obtaining a white light with good color rendering index and color temperature, the first wavelength light A, the first sub wavelength light B1 and the second sub wavelength light B2 are chosen as a red region light 601, a green region light 602 and a blue region light 603, this order is exchangeable. In the light adjusting method of FIG. 5, the first wavelength light C, the second wavelength light D and the third wavelength light E can be a red region light 601, a green light 602 and a blue region light 603 respectively, this order is also exchangeable. In FIG. 6, the red region light 601 is corresponded to a color coordinate X/Y=0.680/0.317, luminosity=16.8%; the green region light 602 is corresponded to a color coordinate X/Y=0.167/0.740, luminosity=34.6%; and a blue region light is corresponded to a color coordinate X/Y=0.125/0.108, luminosity=7.9%. A white light with a wavelength region between 380 nm and 780 nm, luminosity=100% as a reference.

Figure 7:
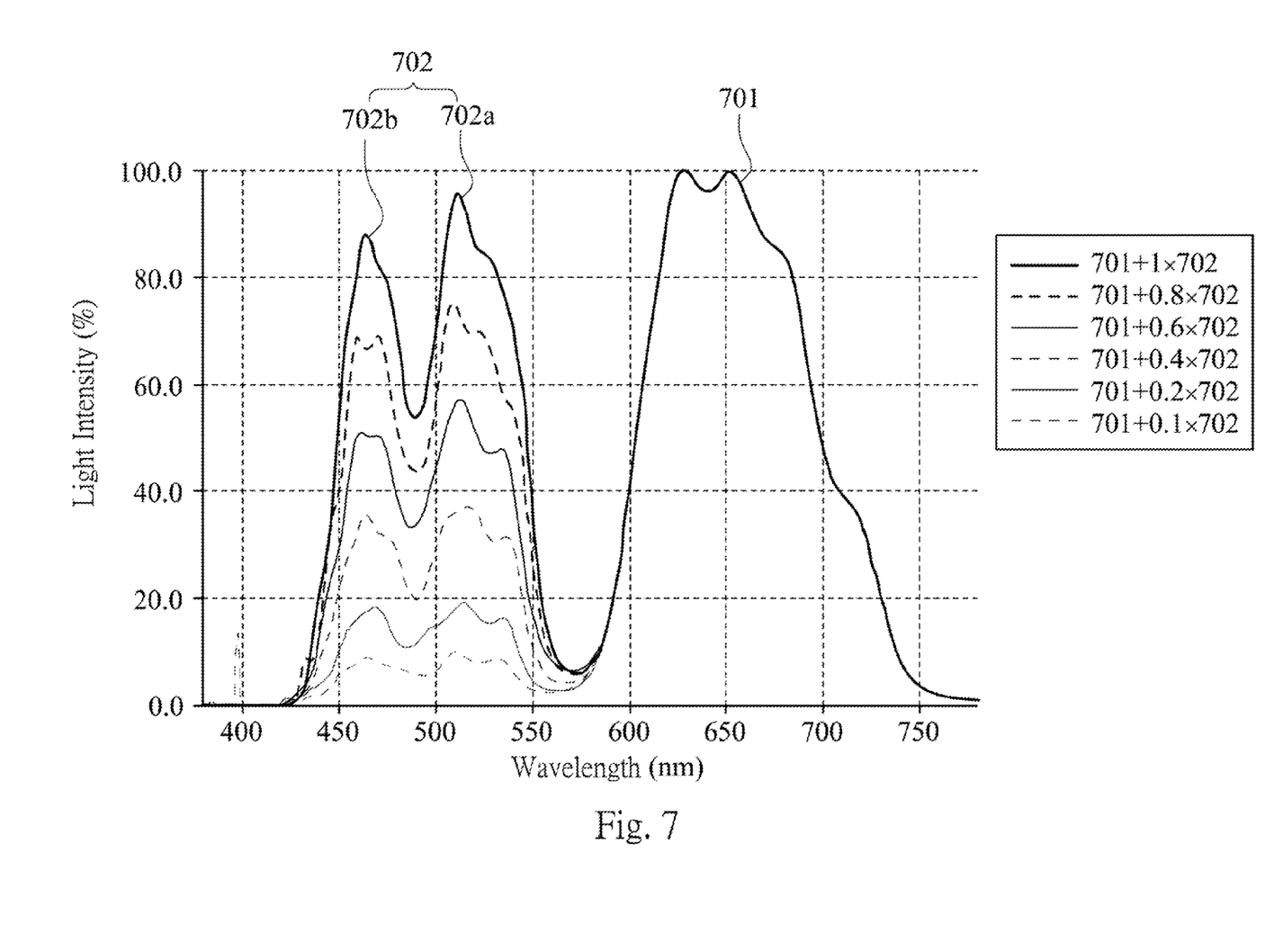
FIG. 7 shows a light intensity versus wavelength according to another embodiment of the light adjusting method in FIG. 4 or FIG. 5.

FIG. 7 shows a light intensity versus wavelength according to another embodiment of the light adjusting method in FIG. 4 or FIG. 5. In FIG. 7, a red region light 701 and a cyan region light 702 are mixed for forming a white light. The cyan region light 702 is composed of a green region light 702a with 80% relative light intensity and a blue region light 702b with 90% relative light intensity. In FIG. 7, the cyan region light 702 is corresponded to a color coordinate X/Y=0.146/0.351, luminosity=33.4%. The red region light 701 and the cyan region light 702 can be adjusted respectively for obtaining different light adjusting effect. In FIG. 7, each curve represents the fixed light intensity of the red region light 701 mixed with different light intensity of the cyan region light 702, the relation of the light intensity can be referred as **701+x\*702**, x=1, 0.8, 0.6, 0.4, 0.2, and 0.1. The color coordinate and the luminosity are shown in the following table 1.

TABLE 1

| Condition | Color Coordinate (X/Y) | Luminosity |
|---|---|---|
| 701 (red region light) | 0.680/0.317 | 16.8% |
| 702 (cyan region light) | 0.146/0.351 | 33.4% |
| 701 + 1 * 702 | 0.334/0.341 | 49.9% |
| 701 + 0.8 * 702 | 0.363/0.34 | 43.3% |
| 701 + 0.6 * 702 | 0.400/0.337 | 36.7% |
| 701 + 0.4 * 702 | 0.455/0.333 | 30.0% |
| 701 + 0.2 * 702 | 0.538/0.327 | 23.4% |
| 701 + 0.1 * 702 | 0.596/0.327 | 20.4% |

Figure 8:
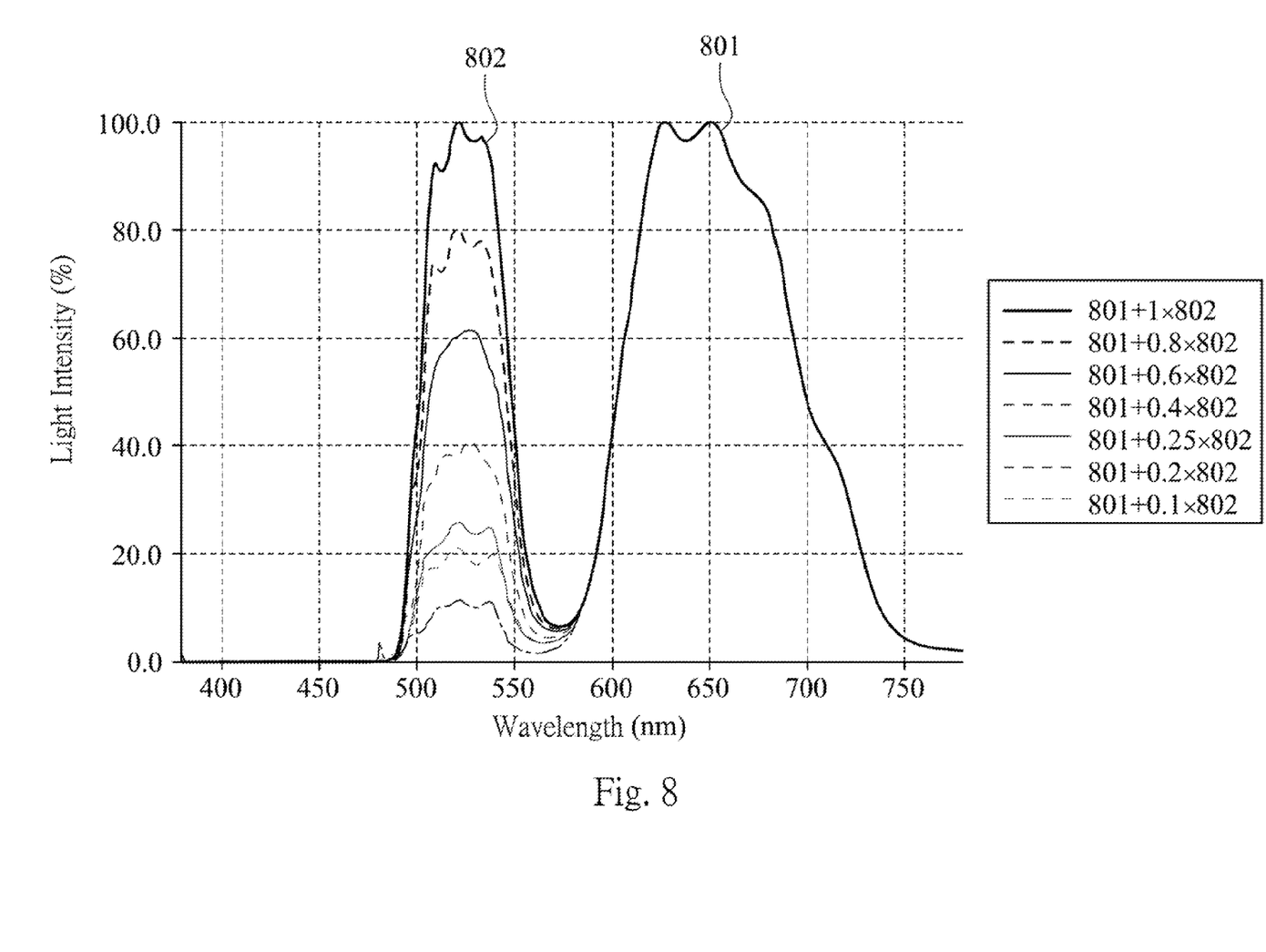
FIG. 8 shows a light intensity versus wavelength in a night time according one embodiment of the present disclosure.

FIG. 8 shows a light intensity versus wavelength in a night time according one embodiment of the present disclosure. Owing to a blue region light will decrease the quantity of Melatonin, and in a night time, the quantity of Melatonin is dramatically increased. In the embodiment, the blue region light is removed, and the emitted light is mixed from a red region light 801 and a green region light 802. In FIG. 8, each curve represents the fixed light intensity of the red region light 801 mixed with different light intensity of the green region light 802. The relation of the light intensity can be referred as **801+x\*802**, x=1, 0.8, 0.6, 0.4, 0.25, 0.2 and 0.1. The color coordinate and the luminosity are shown in the following table 2.

TABLE 2

| Condition | Color Coordinate (X/Y) | Luminosity |
|---|---|---|
| 801 (red region light) | 0.680/0.317 | 16.8% |
| 802 (green region light) | 0.167/0.740 | 34.6% |
| 801 + 1 * 802 | 0.442/0.518 | 50.4% |
| 801 + 0.8 * 802 | 0.471/0.493 | 43.8% |
| 801 + 0.6 * 802 | 0.503/0.467 | 37.5% |
| 801 + 0.4 * 802 | 0.548/0.430 | 30.4% |
| 801 + 0.25 * 802 | 0.588/0.396 | 25.3% |
| 801 + 0.2 * 802 | 0.600/0.386 | 24.1% |
| 801 + 0.1 * 802 | 0.636/0.356 | 20.5% |

Figure 9:
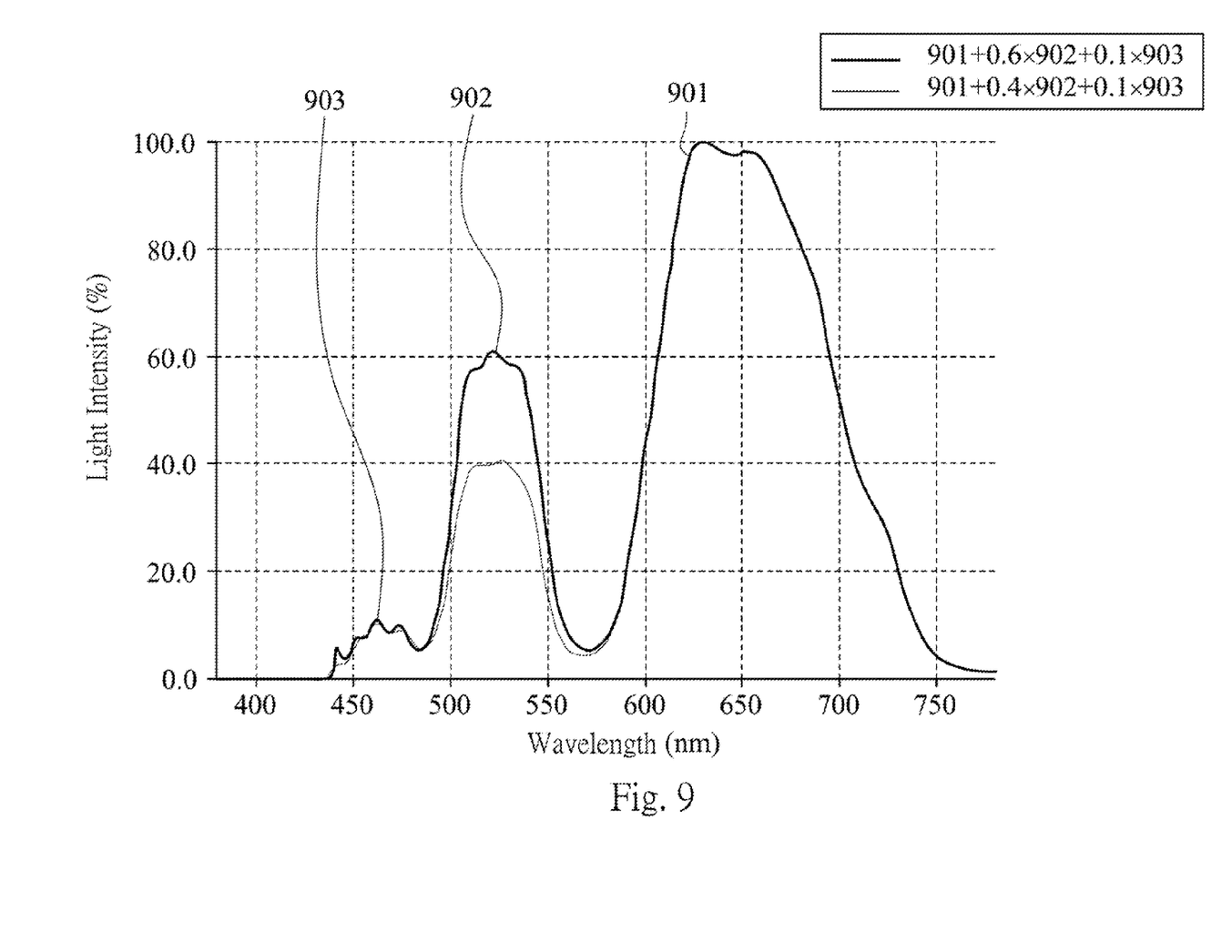
FIG. 9 shows a light intensity versus wavelength in a night time according to another embodiment of the present disclosure.

FIG. 9 shows a light intensity versus wavelength in a night time according to another embodiment of the present disclosure. In FIG. 8, the blue region light is removed for preventing a decreasing on the quantity of Melatonin. However, sometimes it is required to read in the night time. Therefore, in the embodiment, a blue region light 903 is added for obtaining a mixed light having various colors and color temperature, and the mixed light is switchable between reading in the night time and inhibition of the quantity of Melatonin. In FIG. 9, the emitted light is composed a red region light 901, a green region light 902 and a blue region light 903. In FIG. 9, each curve represents the fixed light intensity of the red region light 901 mixed with different light intensity of the green region light 902 and the blue region light 903. The relation of the light intensity can be referred as **901+x\*902+y\*903**, (x, y)= (0.6, 0.1) and (0.4, 0.1). The color coordinate and the luminosity are shown in the following table 3.

TABLE 3

| Condition | Color coordinate (X/Y) | Luminosity |
|---|---|---|
| 901 (red region light) | 0.680/0.317 | 16.8% |
| 902 (green region light) | 0.167/0.740 | 34.6% |
| 903 (blue region light) | 0.125/0.108 | 7.9% |
| 901 + 0.6 * 902 + 0.1 * 903 | 0.478/0.441 | 37.9% |
| 901 + 0.4 * 902 + 0.1 * 903 | 0.514/0.405 | 31.2% |

Figure 10:
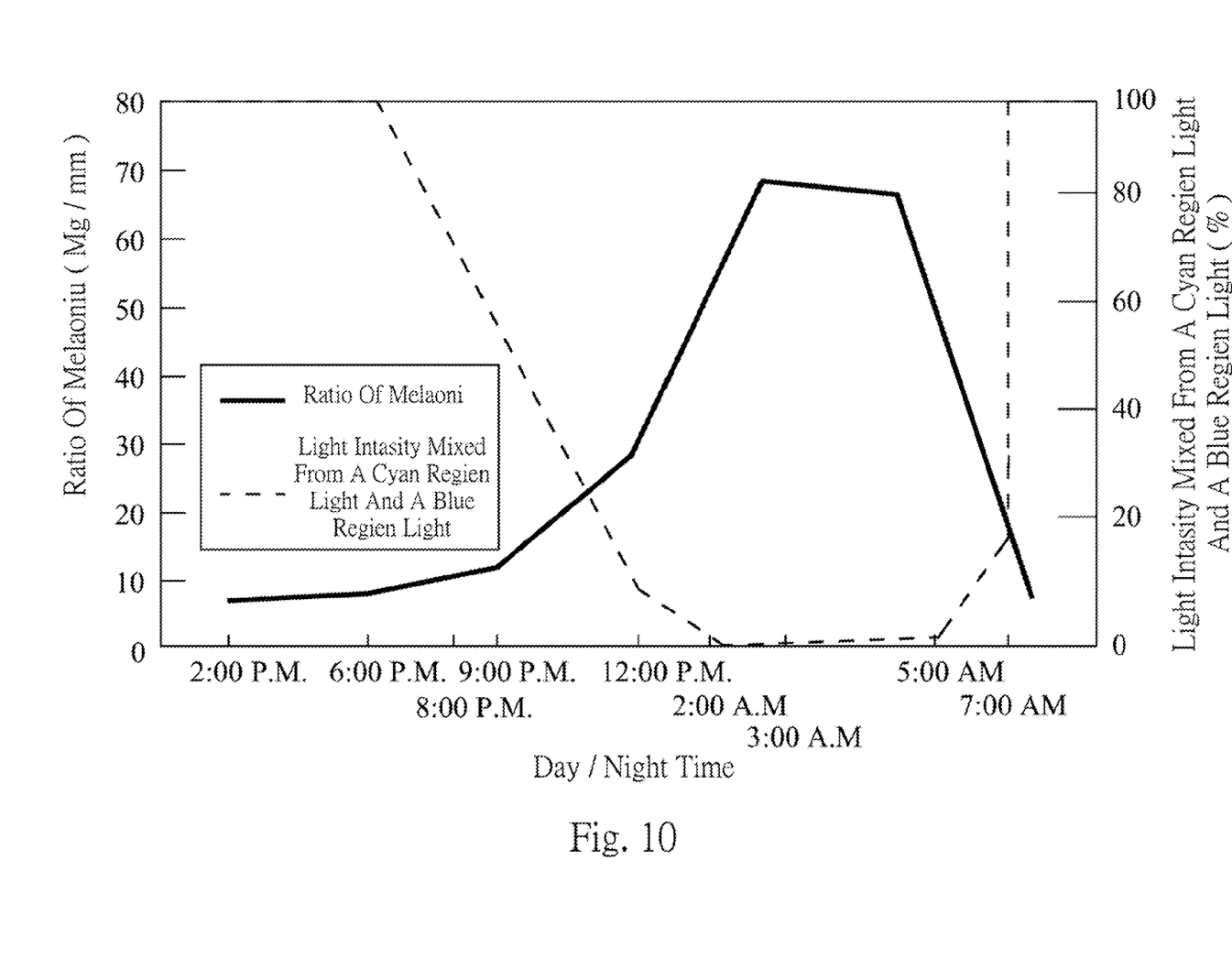
FIG. 10 shows a light intensity mixed from a cyan region light and a blue region light and a ratio of Melatonin mixed with a day/night variation.

FIG. 10 shows a light intensity mixed from a cyan region light and a blue region light and a ratio of Melatonin mixed with a day/night variation. In the day time, the emitted light is composed of a red region light 901 with 100% light intensity and a cyan region light (mixed from the blue region light 903 and the green region light 902) with 100% light intensity, and is a white light. At 6~7:00 pm, light intensity of the cyan region light is gradually decreased to 60% until 9:00 pm. At 9:00 pm, the quantity of Melatonin is starting increased dramatically. Therefore, the light intensity of the blue region light 903 is decreased dramatically, and the light intensity ratio of each component of the white light is red region light 901: green region light 902: blue region light 903=100:60:10. At 12:00 pm, the light intensity ratio of each component of the white light changes to red region light 901: green region light 902: blue region light 903=100:40:10. At 2:00 am, the blue region light 903 is totally turned off, and the light intensity ratio of each component of the white light changes to red region light 901: green region light 902=100:40. At 5:00 am, the blue region light 903 is gradually increased, and the light intensity ratio of each component of the white light changes to red region light 901: green region light 902: blue region light 903=100:40:10. At 7:00 am, the emitted white light returns to its original state in a day time, which is composed of the red region light 901 with 100% light intensity and the cyan region light (mixed from the blue region light 903 and the green region light 902) with 100% light intensity.

From above, a day/night switchable light adjusting device and light adjusting method thereof is provided. The light adjusting can utilize the three primary colors of the light for forming a white light with different color levels. With a day/night variation, light intensity of the blue region light or the cyan region light can be reduced for preventing an inhibition of the quantity of Melatonin. Various embodiments of the light adjusting method are also disclosed in the present disclosure, and a light with high color rendering index and excellent color temperature is obtained.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A day/night switchable light adjusting device for maintaining normal melatonin secretion of human body, comprising:
   a first panel comprising at least one first lighting unit and a first reflecting surface, wherein the first lighting unit is an organic light emitting diode panel and the first reflecting surface is disposed underneath the first lighting unit, and the first lighting unit emitting a first wavelength light;
   a second panel, one side of the second panel is connected with one side of the first panel and an angle and at least one opening are formed between the first panel and the second panel, the second panel comprising at least one second lighting unit and a second reflecting surface, each second lighting unit comprising two sub lighting units, wherein the two sub lighting units are organic light emitting diode panels and the second reflecting surface is disposed underneath the two sub lighting units, the two sub lighting units emitting a first sub wavelength light and a second sub wavelength light respectively, and the first sub wavelength light and the second sub wavelength light are mixed for forming a second wavelength light;
   a light collecting component disposed on the opening; and
   a control unit electrically connected to the first lighting unit and the second lighting unit, the control unit adjusting the first wavelength light and the second wavelength light with a day/night variation respectively, wherein the first wavelength light and the second wavelength light are mixed for forming a white light with various color levels, and a blue region light or a cyan region light of the white light is varied with the day/night variation;
   wherein the first reflecting surface and the second reflecting surface reflect the first wavelength light and/or the second wavelength light, and the first wavelength light, a reflected light of the first wavelength light, the second wavelength light, and a reflected light of the second wavelength light are mixed on the light collecting component;
   wherein the first reflecting surface comprises a first portion being exposed out and a second portion being covered by the first lighting unit, and the second reflecting surface comprises a first portion being exposed out and a second portion being covered by the second lighting unit;
   wherein the first wavelength light or the second wavelength light is reflected by the first portions and the second portions of the first reflecting surface and the second reflecting surface;
   wherein the light intensity of the blue region light or the cyan region light is decreased from a day time to a night time.

2. The day/night switchable light adjusting device of claim 1, further comprising:
   at least one reflecting component connected with one side of the first panel and one side of the second panel;
   wherein the reflecting component reflects the first wavelength light and the second wavelength light.

3. The day/night switchable light adjusting device of claim 1, wherein the angle is smaller than 180 degrees.

4. The day/night switchable light adjusting device of claim 1, wherein one of the first wavelength light and the second wavelength light is a yellow region light, and the other is a blue region light.

5. The day/night switchable light adjusting device of claim 1, wherein one of the first wavelength light and the second wavelength light is a cyan region light, and the other is a red region light.

6. The day/night switchable light adjusting device of claim 1, wherein each of the first wavelength light, the first sub wavelength light and the second sub wavelength light is a red region light, a green region light, a magenta region light or a blue region light, respectively.

7. The day/night switchable light adjusting device of claim 1, wherein each of the first wavelength light, the first sub wavelength light and the second sub wavelength light is a red region light, a green region light, a magenta region light or a cyan region light, respectively.

8. A light adjusting method applied to the day/night switchable light adjusting device of claim 1, comprising:
- providing at least one reflecting component being connected with one side of the first panel and one side of the second panel;
- selecting different colors of the first wavelength light and the second wavelength light, wherein the second wavelength light is formed from mixing of the first sub wavelength light and the second sub wavelength light, and one of the first wavelength light, the first sub wavelength light and the second sub wavelength light is a blue region light or a cyan region light;
- adjusting the light intensity of the blue region light or the cyan region light with a day/night variation, and decreasing the light intensity of the blue region light or the cyan region light from a day time to a night time;
- reflecting the first wavelength light and the second wavelength light by the reflecting component, the first reflecting surface and the second reflecting surface; and
- mixing the first wavelength light, the second wavelength light, a reflected light of the first wavelength light and a reflected light of the second wavelength light on the light collecting component.

9. A day/night switchable light adjusting device, comprising:
- a first panel comprising at least one first lighting unit and a first reflecting surface, wherein the first lighting unit is an organic light emitting diode panel and is disposed on the first reflecting surface, the first lighting unit emitting a first wavelength light;
- a second panel comprising at least one second lighting unit and a second reflecting surface, wherein the second lighting unit is an organic light emitting diode panel and is disposed on the second reflecting surface, the second lighting unit emitting a second wavelength light, wherein one side of the second panel is connected with one side of the first panel, and an angle is formed between the first panel and the second panel;
- a third panel comprising at least one third lighting unit and a third reflecting surface, wherein the third lighting unit is an organic light emitting diode panel and is disposed on the third reflecting surface, the third lighting unit emitting a third wavelength light, wherein one side of the third panel is connected with another side of the first panel, another angle is formed between the first panel and the third panel, the first panel, the second panel and the third panel are inter-connected, and an opening is formed;
- a light collecting component disposed on the opening;
- a control unit electrically connected with the first lighting unit, the second lighting unit and the third lighting unit, the control unit adjusting the first wavelength light, the second wavelength light and the third wavelength light respectively with a day/night variation, wherein the first wavelength light, the second wavelength light and the third wavelength light are mixed for forming a white light with various color levels, and a blue region light or a cyan region light of the white light is varied with the day/night variation;
- wherein the first reflecting surface, the second reflecting surface and the third reflecting surface reflect the first wavelength light, the second wavelength light and/or the third wavelength light, and the first wavelength light, a reflected light of the first wavelength light, the second wavelength light, a reflected light of the second wavelength light, the third wavelength light and a reflected light of the third wavelength light are mixed on the light collecting component;
- wherein the first reflecting surface comprises a first portion being exposed out and a second portion being covered by the first lighting unit, the second reflecting surface comprises a first portion being exposed out and a second portion being covered by the second lighting unit, and the third reflecting surface comprises a first portion being exposed out and a second Portion being covered by the third lighting unit;
- wherein the first wavelength light, the second wavelength light or the third wavelength light is reflected by the first portions and the second portions of the first reflecting surface, the second reflecting surface and the third reflecting surface;
- wherein the light intensity of the blue region light or the cyan region light is decreased from a day time to a night time.

10. The day/night switchable light adjusting device of claim 9, further comprising:
- at least one reflecting component connected with one side of the first panel, one side of the second panel and one side of the third panel;
- wherein the reflecting component reflects the first wavelength light, the second wavelength light and the third wavelength light.

11. The day/night switchable light adjusting device of claim 9, wherein the angle between the first panel and the second panel is smaller than 180 degrees, and the another angle between the first panel and the third panel is also smaller than 180 degrees.

12. The day/night switchable light adjusting device of claim 9, wherein each of the first wavelength light, the second wavelength light and the third wavelength light is a red region light, a green region light, a magenta region light or a blue region light, respectively.

13. The day/night switchable light adjusting device of claim 9, wherein each of the first wavelength light, the second wavelength light and the third wavelength light is a red region light, a green region light, a magenta region light or a cyan region light, respectively.

14. A light adjusting method applied to the day/night switchable light adjusting device of claim 9, comprising:
- providing at least one reflecting component being connected with one side of the first panel, one side of the second panel and one side of the third panel;
- selecting different colors of the first wavelength light, the second wavelength light and the third wavelength light, wherein one of the first wavelength light, the second wavelength light and the third wavelength light is a blue region light or a cyan region light;
- adjusting the light intensity of the blue region light or the cyan region light with a day/night variation, and decreasing the light intensity of the blue region light or the cyan region light from a day time to a night time;
- reflecting the first wavelength light, the second wavelength light and the third wavelength light by the reflecting component, the first reflecting surface, the second reflecting surface and the third reflecting surface; and
- mixing the first wavelength light, the second wavelength light, the third wavelength light, a reflected light of the first wavelength light, a reflected light of the second wavelength light and a reflected light of the third wavelength light on the light collecting component.

* * * * *